US009787081B2

(12) United States Patent
Dawley

(10) Patent No.: US 9,787,081 B2
(45) Date of Patent: Oct. 10, 2017

(54) OVERVOLTAGE NOTCHING OF ELECTRICAL SWELLS

(71) Applicant: Electronic Systems Protection, Inc., Knightdale, NC (US)

(72) Inventor: Robert A. Dawley, Clayton, NC (US)

(73) Assignee: Electronic Systems Protection, Inc., Knightdale, NC (US)

( * ) Notice: Subject to any disclaimer, the term of this patent is extended or adjusted under 35 U.S.C. 154(b) by 338 days.

(21) Appl. No.: 14/633,717

(22) Filed: Feb. 27, 2015

(65) Prior Publication Data

US 2016/0254660 A1    Sep. 1, 2016

(51) Int. Cl.
*H02H 3/22* (2006.01)
*H02H 3/20* (2006.01)
*H02H 1/00* (2006.01)
*H02H 9/04* (2006.01)

(52) U.S. Cl.
CPC ............ *H02H 3/22* (2013.01); *H02H 1/0007* (2013.01); *H02H 3/20* (2013.01); *H02H 9/04* (2013.01)

(58) Field of Classification Search
CPC .......... H02H 1/0007; H02H 3/04; H02H 3/20; H02H 3/22; H02H 9/02; H02H 9/04
USPC .................................................. 361/86, 93.1
See application file for complete search history.

(56) References Cited

U.S. PATENT DOCUMENTS

2011/0068849 A1    3/2011  Grover
2013/0027077 A1*   1/2013  Oughton, Jr. .......... G01R 31/40
                                                  324/764.01

FOREIGN PATENT DOCUMENTS

CN    104134997 A    11/2014
CN    104280644 A     1/2015

OTHER PUBLICATIONS

Machine translation of Tian et al. Chinese Patent document CN 104134997 A, Nov. 5, 2014.*
European Search Report issued in corresponding European Patent Application No. 16157581, mailed on Jul. 6, 2016.

* cited by examiner

*Primary Examiner* — Thienvu Tran
*Assistant Examiner* — Kevin J Comber
(74) *Attorney, Agent, or Firm* — Edell, Shapiro & Finnan LLC

(57) ABSTRACT

To protect a connected electrical load from anomalous electricity, an apparatus has a condition sensing unit configured to distinguish a power event type from among power event types from characteristics of an input electricity waveform accepted through an input port. The condition sensing unit indicates the power event type when a corresponding overvoltage criterion is met by characteristics of the input electricity waveform. A power control unit generates, responsive to a power event, a modulation signal that defines at least one amplitude notch in the input electricity waveform in accordance with the power event type. A switching mechanism electrically interposed between the input port and the output port transitions into conducting and nonconducting states in accordance with the modulation signal to superimpose the notch on the input electricity waveform.

19 Claims, 12 Drawing Sheets

OVERVOLTAGE NOTCHING OF ELECTRICAL SWELLS

TECHNICAL FIELD

The present disclosure relates to limiting voltage delivered by power conditioning and control systems.

BACKGROUND

Electrical load protection devices are electrically interposed between electrical load equipment and electrical source equipment and are designed to protect the load equipment from exceptionable characteristics of electricity received from the source equipment. One type of electrical load protection device is the surge suppressor, which is used to prevent voltage surges from reaching the load equipment. As used herein, a power or voltage surge, or simply "surge," is a transient overvoltage condition of short duration, e.g., 20-50 μs. Traditional surge suppression techniques include shunting mode suppression, by which surge energy is shunted to a neutral or ground conductor. Examples of such shunting techniques are disclosed in U.S. Pat. No. 5,136,455 dated Aug. 4, 1992 and entitled, "Electromagnetic Interference Suppression Device," and U.S. Reissue Pat. RE39,446 dated Dec. 26, 2006 and entitled, "Power Filter Circuit Responsive to Supply System Fault Conditions." Another surge suppression technique is series mode suppression, by which surge energy is series limited and canceled, and may be further ameliorated by shunt absorption. Examples of series mode suppression techniques are disclosed in U.S. Pat. No. 6,728,089 dated Apr. 27, 2007 and entitled, "Surge Suppressor for Wide Range of Input Voltages," U.S. Pat. No. 6,744,613 dated Jun. 1, 2004 and entitled, "System and Method for Filtering Multiple Adverse Characteristics from a Power Supply Source," U.S. Pat. No. 7,184,252 dated Feb. 27, 2007 and entitled, "Surge Protector with Input Transformer," and U.S. Pat. No. 7,511,934 dated Mar. 31, 2009 and entitled, "System and Method for Conditioning a Power Supply Transmission for Supply to a Load Circuit."

Shunt mode suppression typically carries the lowest cost and is the smallest size option, but it allows exposure of connected load equipment to fairly high amplitude residual voltages. The cost of implementing series mode suppression is typically higher than that of shunt mode suppressors and they are usually larger in size. However, series mode suppressors are capable of limiting exposure to surge voltages at the load to much lower levels, e.g., to within ±10% of the nominal AC line voltage envelope. One drawback common to both of these technologies is that neither provides adequate mitigation of persistent AC overvoltage, referred to herein by as a "voltage swell.".

Voltage swells are characterized by their RMS magnitude and duration. For example, the Institute of Electrical and Electronics Engineers (IEEE) 1159 defines a voltage swell as an increase in the root-mean squared (RMS) voltage level to 110%-180% of nominal at the power frequency for durations of ½ cycle to one (1) minute. It is classified as a short duration voltage variation phenomena, although typically much longer than a voltage surge. Voltage swell is basically the opposite of a voltage sag or dip and although the effects of a voltage sag are more noticeable, the effects of a voltage swell are often more destructive. Voltage swells may cause breakdown of components through gradual, accumulative effects, and can cause control problems and hardware failure in the equipment due to overheating that could eventually result in shutdown. Thus, efforts to develop and/or improve mitigation techniques for both voltage surges and voltage swells, among other undesirable power conditions, are ongoing.

SUMMARY

The present general inventive concept realizes technology that limits the connected equipment surge voltage exposure amplitude to below that of traditional technology and limits the connected equipment persistent overvoltage exposure amplitude while allowing the connected equipment to continue operating.

To protect a connected electrical load from anomalous electricity, an apparatus has a condition sensing unit configured to distinguish a power event type from among power event types from characteristics of an input electricity waveform accepted through an input port. The condition sensing unit indicates the power event type when a corresponding overvoltage criterion is met by characteristics of the input electricity waveform. A power control unit generates, responsive to a power event, a modulation signal that defines at least one amplitude notch in the input electricity waveform in accordance with the power event type. A switching mechanism electrically interposed between the input port and the output port transitions into conducting and non-conducting states in accordance with the modulation signal to superimpose the notch on the input electricity waveform.

DESCRIPTION OF EXAMPLE EMBODIMENTS

Figure 1A:
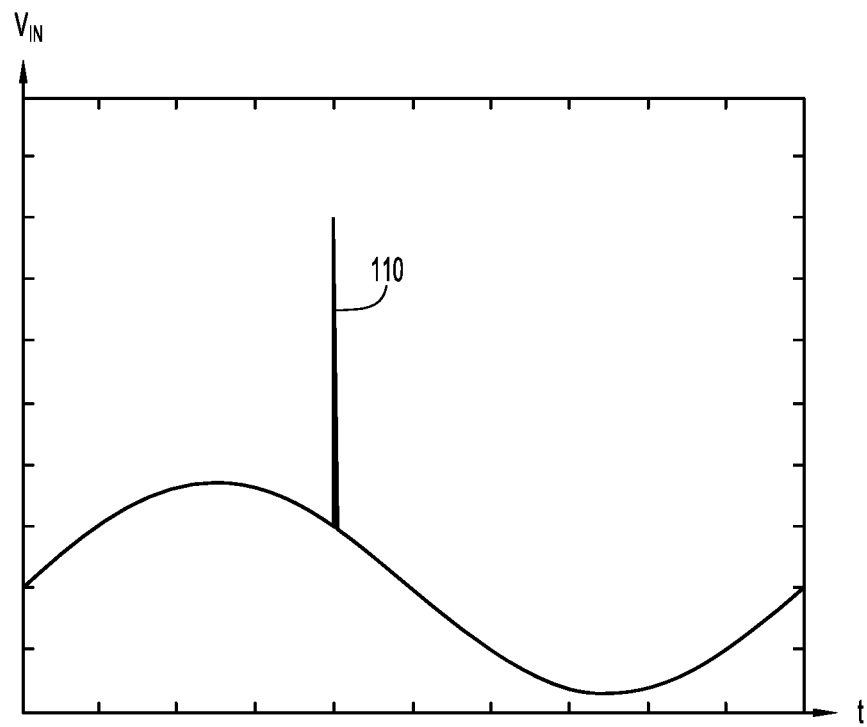
FIGS. 1A-1B are diagrams of voltage waveforms illustrating anomalous electricity mitigation by embodiments of the present general inventive concept.
Figure 1A:
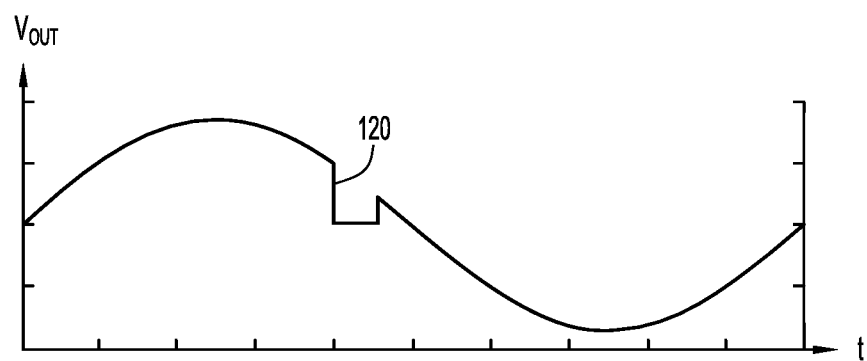

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The figures described herein include schematic block diagrams illustrating various functional modules for purposes of description and explanation. Such diagrams are not intended to serve as electrical schematics and interconnections illustrated are merely to depict various interoperations between functional components and/or processes and are not necessarily direct electrical connections between such components. Moreover, the functionality illustrated and described via separate components need not be distributed as shown, and the discrete blocks in the diagrams are not intended to depict discrete electrical components.

Figure 1B:
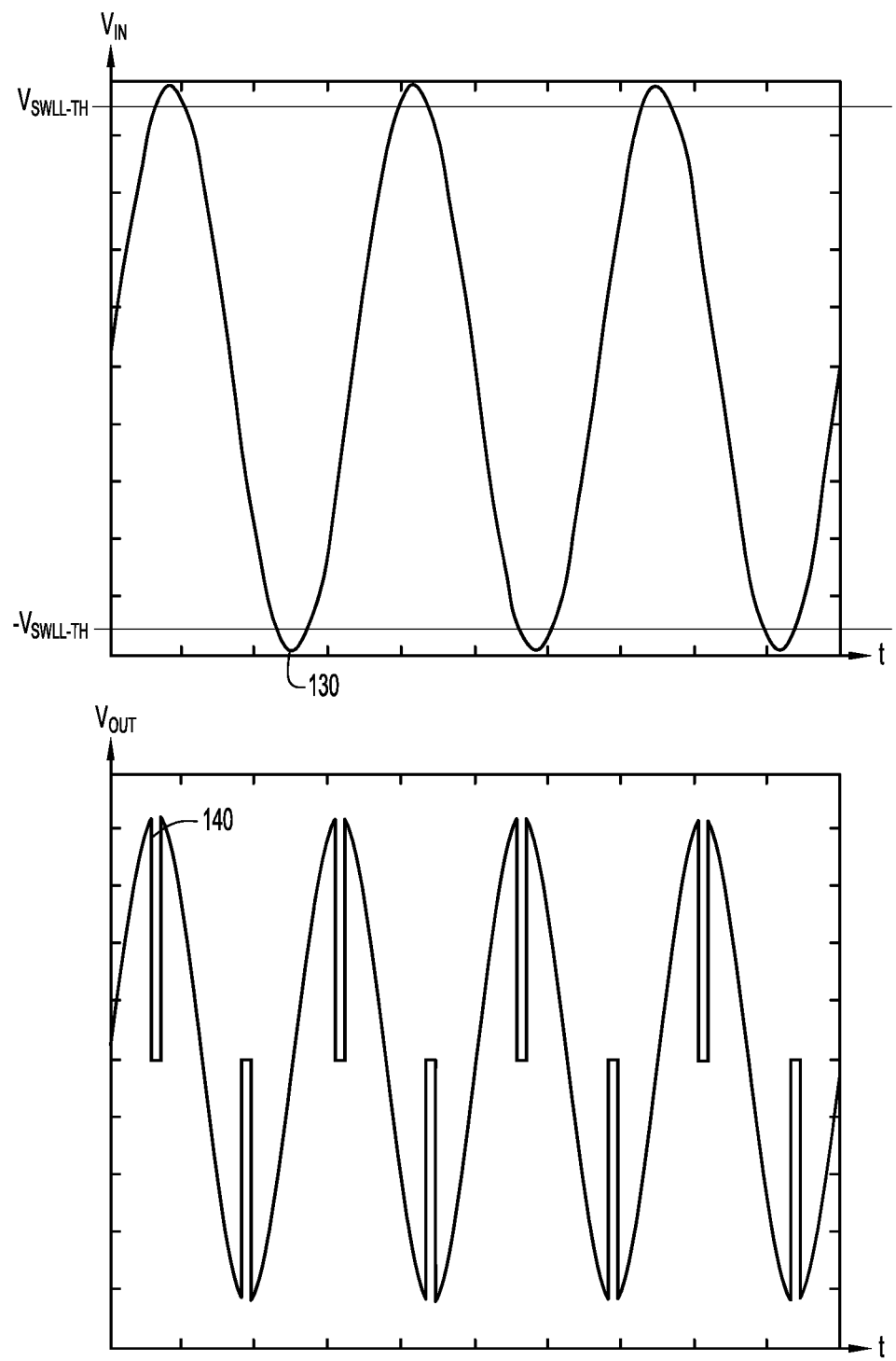

The present invention may be embodied to mitigate both transient surge overvoltage conditions and persistent swell overvoltage conditions. To that end, embodiments may include switching circuitry capable of changing state very rapidly, e.g., on the order of 1 µs, and associated control methods to "notch" transient voltages from the delivered electricity. FIG. 1A illustrates a voltage surge 110 superimposed onto input voltage $V_{IN}$. Through an embodiment of the present invention, a corresponding voltage notch 120 is established in output voltage $V_{OUT}$ at the location in the waveform at which surge 110 was located on $V_{IN}$. Similar mitigation of voltage swells, in which peaks 130 of $V_{IN}$ exceed a predetermined threshold $V_{SWLL-TH}$, is illustrated in FIG. 1B. Through an embodiment of the present invention, voltage notches, representatively illustrated by voltage notch 140, are established in $V_{OUT}$ at each offending peak location.

Figure 2:
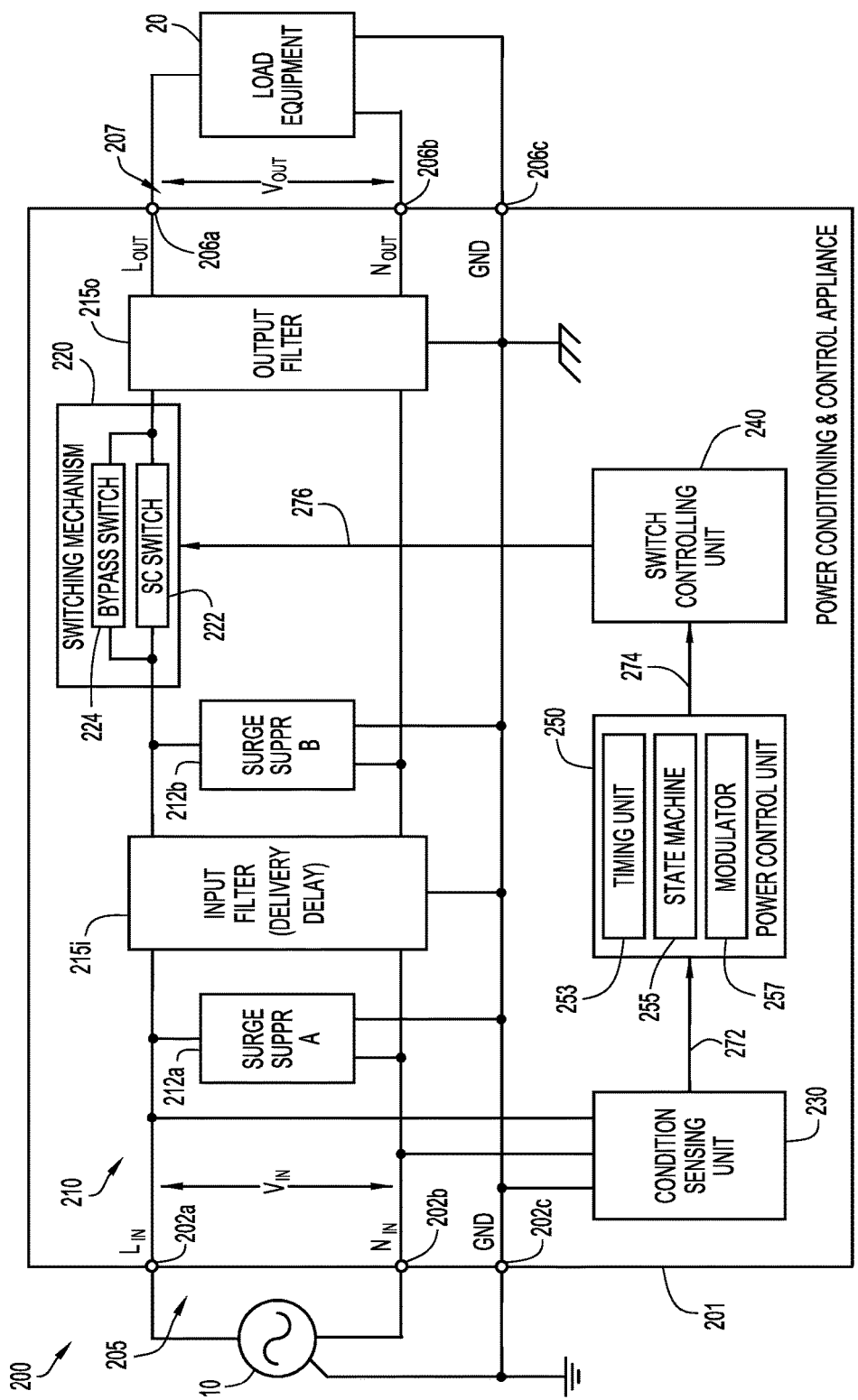
FIG. 2 is a schematic block diagram of a power conditioning and control appliance by which the present general inventive concept can be embodied.

FIG. 2 is a schematic block diagram of an exemplary power conditioning and control appliance (PCCA) 200 by which the present invention can be embodied. Exemplary PCCA 200 is an electrical circuit that, when electrically interposed between an electrical source 10 and electrical load equipment 20, can improve power quality and protect load equipment 20 against various exceptionable electrical conditions.

It is to be understood that the functional blocks of which exemplary PCCA 200 is comprised are conceptual and are not intended to represent specific, individual components or hard functional boundaries. That is, separation of power conditioning and control functionality into the blocks illustrated in FIG. 2 and elsewhere in this disclosure is intended solely to facilitate efficient description of exemplary embodiments of the present invention. Indeed, the functionality of the separate modules illustrated in FIG. 2 may be combined, divided, and otherwise repartitioned into other modules, essentially without limitation. Additionally, components other than and/or in addition to those illustrated in and described herein may be incorporated into PCCA 200 or other embodiments of the present invention. Upon review of this disclosure, those having skill in the power conditioning and control arts will recognize numerous configurations in which PCCA 200 may be realized without departing from the spirit and intended scope of the present invention.

Exemplary PCCA 200 comprises an AC conditioned power delivery unit 210, or simply "power delivery unit 210," a switching mechanism 220, a condition sensing unit 230, a switch controlling unit 240 and a power control unit 250. In certain embodiments, power delivery unit 210, switching mechanism 220, a condition sensing unit 230, a switch controlling unit 240 and a power control unit 250 are disposed on a chassis or contained within a housing, generally referred to herein as housing 201. One or more input ports 205 comprising input terminals 202a-202c may be disposed on housing 201 through which input electrical power is accepted from an electrical power source, such as AC power source 10. Additionally, one or more output ports 207 comprising output terminals 206a-206c may be disposed on housing 201 through which output electrical power is provided to electrical load equipment 20. It is to be understood that while PCCA 200 is described herein as being intended for use with AC electrical systems, the inventive concepts described herein could also be applied to DC electrical systems. Additionally, for purposes of explanation, it is to be assumed that PCCA 200 is constructed or otherwise configured to mitigate both transient surge overvoltage conditions and persistent swell overvoltage conditions by way of the notching techniques exemplified herein.

Power delivery unit 210 of PCCA 200 may include surge suppression circuitry, illustrated in FIG. 2 as surge suppression stages 212a and 212b, collectively referred to herein as surge suppressor 212. Surge suppression stage 212a provides initial surge suppression and may be constructed from metal oxide varistors (MOVs), or MOVs combined with gas discharge tubes, or series mode technologies. Surge suppression stage 212b may provide secondary/supplementary surge suppression and, in addition to the aforementioned surge suppression components, may include transient voltage suppressor (TVS) diodes and/or bridge rectifier and silicon-controlled rectifier (SCR) clamp/crowbar combinations. It is to be understood that the present invention can be embodied without surge suppressor 212.

Power delivery unit 210 may include an electrical filter 215 comprising an input filter 215i and an output filter 215o. Input filter 215i may be a standard electromagnetic interference/radio-frequency interference (EMI/RFI) AC power line filter including inductors, chokes, capacitors, and resistors. Input filter 215i may, by virtue of its construction, introduce a time delay in delivery of AC power to switching mechanism 220. Such a delay allows switching mechanism 220 to be operated into an appropriate state prior to the overvoltage electrical waveform arriving thereat.

Output filter 215o may also include inductors, capacitors, and resistors interconnected to perform smoothing of output waveforms. Output filter 215o may also provide, among other things, snubber functionality by which the impact of inductive loads subjected to rapidly switching conditions is ameliorated.

Switching mechanism 220 may comprise circuitry capable of rapid state transitions, e.g., on the order of 1 µs, and that cooperates with various support circuits and control methods described below to form notches in electrical waveforms. It is to be understood that while switch circuit 220 is illustrated in FIG. 2 as being installed in the line conductor, alternative or additional circuitry can be installed in the neutral conductor and/or in other line conductors, e.g. in multiple phase AC implementations.

Switching mechanism 220 may comprise one or more power metal-oxide-semiconductor field-effect transistors (MOSFETs) in a semiconductor switch component 222, because of their inherent body diode, switching speed, and ease of use. Other power semiconductor devices may be utilized to perform equivalent functions, including insulated-gate bipolar transistors (IGBTs) and gate turn-off (GTO) thyristors. Switching mechanism 220 may be a hybrid switch circuit that includes a bypass switch component 224, such as an electromagnetic relay, electrically connected in parallel with semiconductor switch component 222. When so embodied, bypass switch component 224 may be operated into a closed state, thus bypassing semiconductor switch component 222, when PCCA 200 is operating under nominal operating conditions, i.e., where the input electricity is free of surges and swells. In this nominal configuration, semiconductor switch component 222 may be in its non-conducting state, whereby electrical power is provided to load equipment 20 entirely through bypass switch component 224. When an anomaly is sensed between input terminals 202a, 202b and/or 202c, semiconductor switch component 222 may be compelled into its conducting state and, shortly thereafter, bypass switch component 224 may be compelled into its open state. These actions place switching mechanism 220 in a notching mode or configuration, i.e., electrical power through switching mechanism 220 is controlled solely by the semiconductor circuitry, which can be operated at higher rates than the bypass circuitry, e.g., an electromagnetic relay. It is to be understood that bypass switch component 224 need not be implemented in order to achieve benefits of the present invention.

Condition sensing unit 230 may be constructed or otherwise configured to monitor input electricity accepted through input port 205. Condition sensing unit 230 may be configured to generate a condition-indicating signal 272 in response to various anomalies and/or exceptionable characteristics being present on the input electricity. The condition-indicating signal 272 may be provided to a power control unit (PCU) 250 to prepare and operate switching mechanism 220 based on the condition indicated by condition-indicating signal 272. PCU 250 may generate modulation signal 274 on which a switching waveform is conveyed. Modulation signal 274 may be provided to a switch controlling unit 240 that produces a switch driver signal 276 by which switching mechanism 220 is operated in accordance with modulation signal 274.

Switch controlling unit 240 may be constructed or otherwise configured to drive switching mechanism 220 through rapid state transitions, e.g., on the order of 1 μs. Switch controlling unit 240 may be implemented as a fixed electrical circuit and/or as programmed processor instructions executed by a microprocessor/microcontroller. In one embodiment, switch controlling unit 240 includes a high-speed optically-isolated MOSFET/IGBT driver and associated support circuitry capable of responding to a control signal at the aforementioned 1 μs switching rate. In one alternative, switch controlling unit 240 is implemented by an optically-isolated relay, such as in systems for which the 1 μs switching rate is not essential. It is to be understood that the present invention is not limited to a particular switching rate.

Exemplary PCU 250 includes, among other possible event handling components, a timing unit 253 to, for example, coordinate the transitioning of switch circuit 220 with arrival of the overvoltage waveform thereat, a state machine 255 to, for example, track various power events and switch states, pre-condition switching mechanism 220 for swell or surge operation and a modulator 257 to generate modulation signal 274 in accordance with timing information provided by timing unit 253 and state information provided by state machine 255. Timing unit 253 of exemplary PCU 250 may be constructed or otherwise configured to establish the temporal characteristics of the notch on modulation signal 274 such that, for surge mitigation, the resulting amplitude notch is as temporally narrow as possible, i.e., long enough to encompass the temporal width of the surge and the delay time through input filter 215i. State machine 255 may be constructed or otherwise configured to maintain operational states of power control unit 250 and to transition between such states in accordance with occurrences of power events that include surge and swell overvoltage events. Operation of an exemplary state machine as well as that of an exemplary timing unit is described in further detail below.

As will be recognized by those familiar with power control, power controller 250 may be realized through a wide variety of processing and interface circuitry including, but not limited to fixed analog and digital logic circuits, analog-to-digital converter circuits, digital-to-analog converter circuits, programmable digital logic circuits, application specific circuits, etc., to implement, among other components, general data processors, data-specific processors, signal converters and conditioners, analog and digital signal processors, and so on.

Operation of PCCA 200 will now be described with additional reference to FIGS. 3A-3C, collectively referred to herein as FIG. 3. FIG. 3 diagrammatically depicts several waveforms representing those provided to and generated by circuitry in PCCA 200. It is to be understood that the waveforms of FIG. 3 are not drawn to scale and that relative size between various waveform features has been distorted for purposes of description.

Figure 3A:
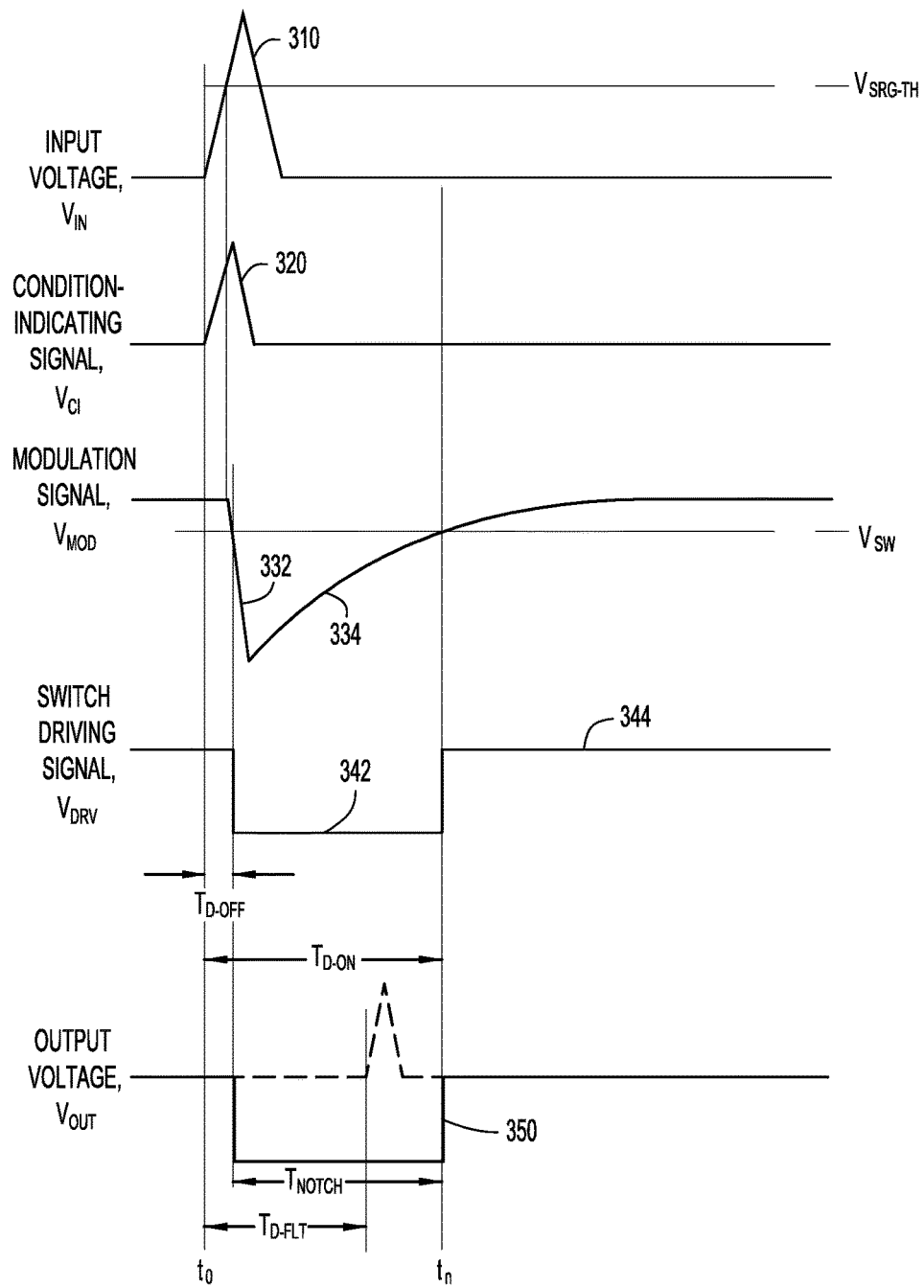
FIGS. 3A-3C are diagrams illustrating notch timing achieved by embodiments of the present general inventive concept.

As illustrated in FIG. 3A, an overvoltage 310 arrives at PCCA 200 on input voltage $V_{IN}$ at some instant in time $t_0$. If the amplitude and spectral characteristics indicate that overvoltage 310 is indeed a voltage surge warranting intervention, such may be indicated on condition-indicating signal $V_{CP}$, e.g., by way of a voltage trigger 320. Voltage trigger 320 may activate timing unit 253 of PCU 250, which may be preconfigured with notch timing parameters in accordance with which modulation signal $V_{MOD}$ is generated. As illustrated in FIG. 3A, for example, modulation signal $V_{MOD}$ may rapidly drop, represented by voltage drop 332, in response to voltage trigger 310. Meanwhile, switch controlling unit 240 may be pre-configured with a switching threshold $V_{SW}$ so that at the rate of voltage drop 332, modulation signal $V_{MOD}$ crosses switching threshold $V_{SW}$ in an interval $T_{D-OFF}$, at which time switch controlling unit 240 generates switch driving signal $V_{DRV}$ in an OFF state 342 thereby removing output voltage from load equipment 20. Shortly thereafter, modulation signal $V_{MOD}$ may rise at a predetermined rate, illustrated by voltage rise 334 in FIG. 3A, which may be established by, for example, a resistor-capacitor time constant or timer lapse time. When modulation signal $V_{MOD}$ meets switching threshold $V_{SW}$ after a predetermined interval $T_{D-ON}$, switch controlling unit 240 may generate switch driving signal $V_{DRV}$ in an ON state 344 thereby compelling switching mechanism 220 into its conducting state to provide output voltage to load equipment 20. Thus, a notch 350 is superimposed on output voltage $V_{OUT}$ between time $t_0$ and $t_n$ by timed action of switch mechanism 220 and, in so doing, prevents voltage surge 310 from reaching load equipment 20.

The time delay introduced into the surge current by input filter 215i is indicated in FIG. 3A as $T_{D-FLT}$. In exemplary PCCA 200, delay $T_{D-FLT}$ is fixed by the reactance of input filter 215i. However, in certain embodiments, the delay $T_{D-FLT}$ can be made a system variable through the use of, for example, electrical delay components and/or through programmed instructions in a digital implementation of PCCA 200. The time delays $T_{D-OFF}$ and $T_{D-ON}$ can be user-selected or configurable timing parameters so that voltage surge 310 is encompassed by a minimally-narrow notch 350 having a notch onset time $T_{D-OFF}$ and a notch completion time $T_{D-ON}$.

Figure 3B:
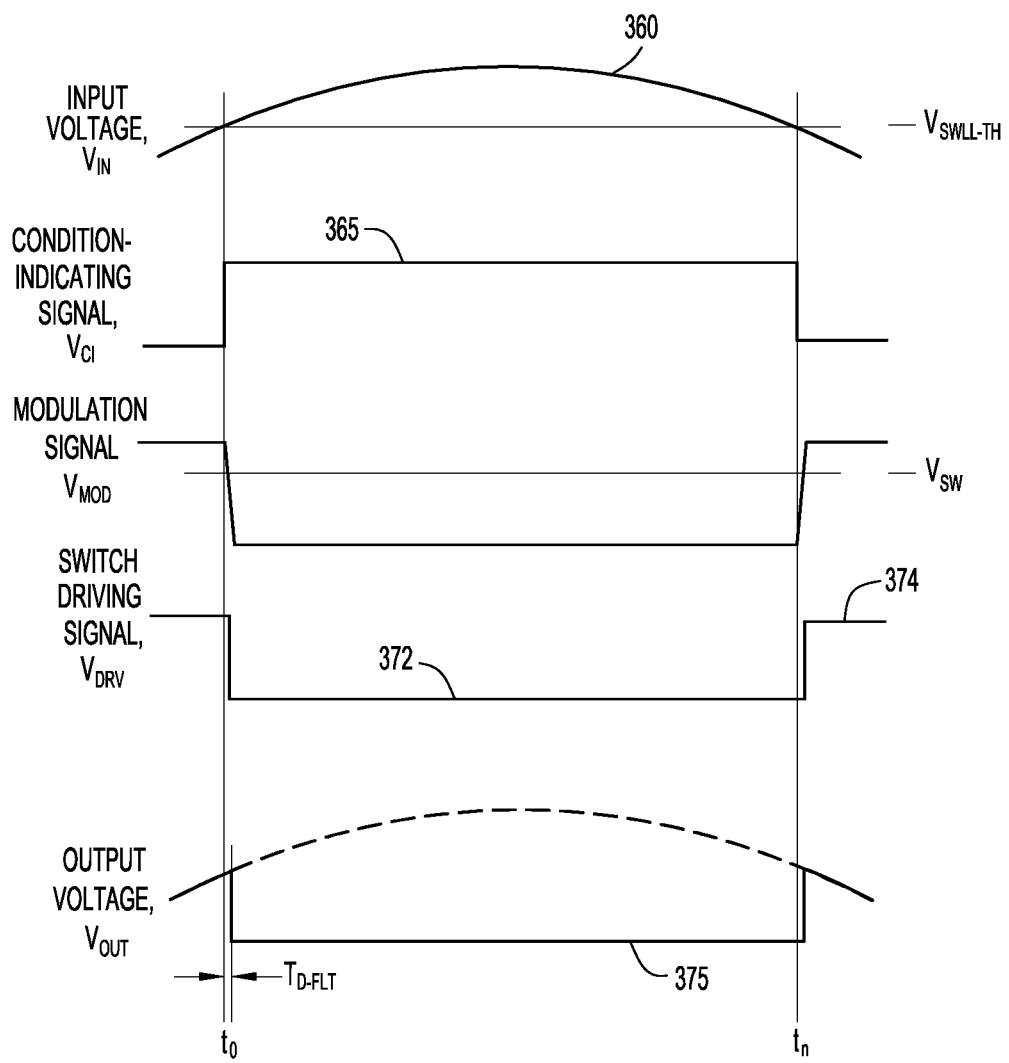

FIG. 3B is a diagram of several exemplary waveforms by which amelioration of voltage swells is explained. At time $t_0$, an overvoltage, illustrated by way of voltage peak 360, may arrive on the input voltage waveform $V_{IN}$. A voltage swell is acknowledged by condition sensing unit 230 when peak 360 of $V_{IN}$ exceeds overvoltage threshold $V_{SWLL-TH}$. It is to be understood that $V_{SWLL-TH}$ may be established such that individual crossings of $V_{SWLL-TH}$ by $V_{IN}$ may be ignored with regard to notching the output voltage $V_{OUT}$, but prolonged or persistent such crossings of $V_{SWLL-TH}$ by $V_{IN}$ may compel power control unit 250 to take mitigating action, i.e., notching the output voltage at each peak 360 that crosses $V_{SWLL-TH}$. However, in other embodiments, a notch, such as that illustrated in FIG. 3B at notch 375, may be superimposed on output voltage VOUT for each overvoltage peak 360 regardless of whether such overvoltage peak 360 is part of a persistent trend.

As illustrated in FIG. 3B, condition-indicating signal $V_{CI}$ rises to a swell-indicating level 365 and remains at that level for the duration over which voltage peak 360 exceeds $V_{SWLL-TH}$. Modulation signal $V_{MOD}$ may fall in response to the rise of condition-indicating signal $V_{CI}$ and may rise in response to the fall of condition-indicating signal $V_{CI}$. In a manner similar to that explained for surge events, the drop of modulation signal $V_{MOD}$ to cross switching threshold $V_{SW}$ may compel switch controlling unit 240 to generate switch driving signal $V_{DRV}$ into an OFF state 372 thereby removing output voltage from load equipment 20. A subsequent rise of modulation signal $V_{MOD}$ may cross switching threshold $V_{SW}$ to compel switch controlling unit 240 to generate switch driving signal $V_{DRV}$ in an ON state 374 thereby compelling switching mechanism 220 into its conducting state to provide output voltage to load equipment 20. Thus, notch 375 is superimposed on output voltage $V_{OUT}$ between time $t_0$ and $t_n$ by timed action of switch mechanism 220 and, in so doing, prevents overvoltage peaks 360 of the voltage swell from reaching load equipment 20.

Figure 3C:
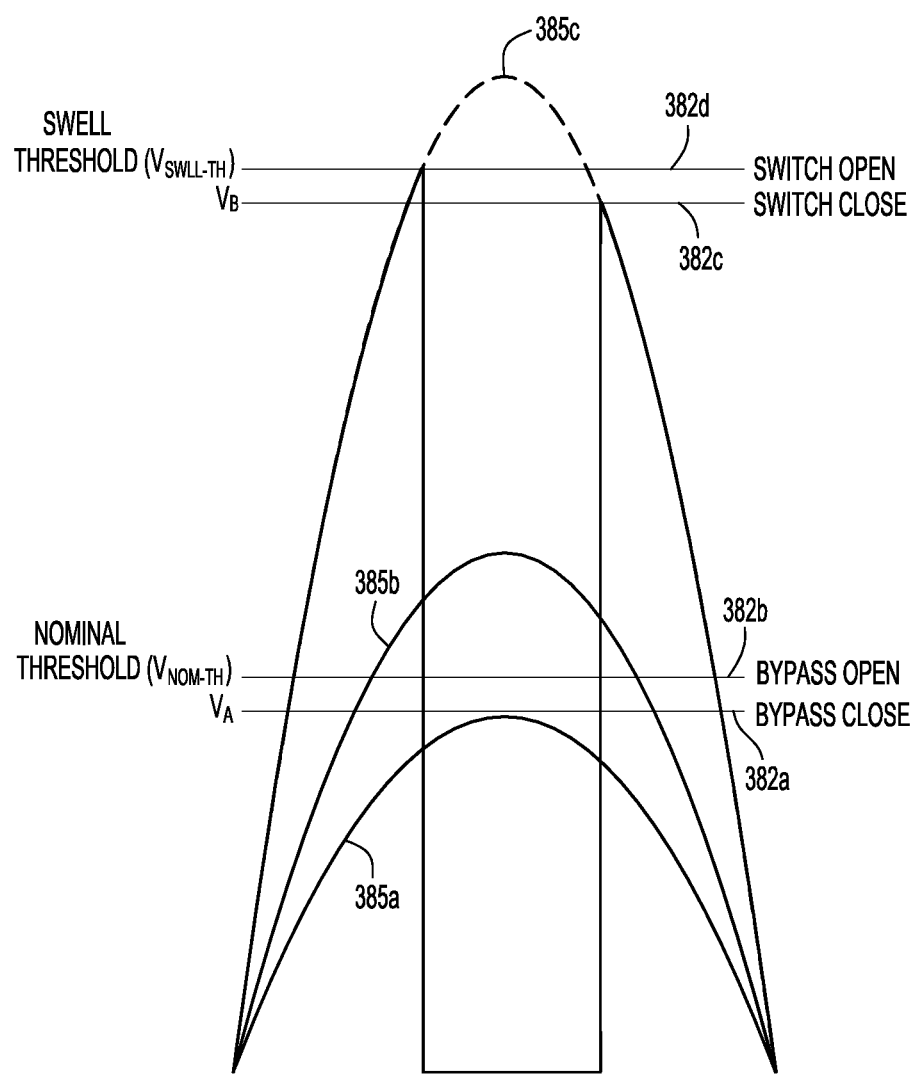

FIG. 3C is a diagram of several exemplary waveforms by which amelioration of voltage swells can be further explained. As indicated above, certain embodiments of the present invention implement a bypass switch component 224 in switching mechanism 220. Typically, the load current conductive path through bypass switch component 224 is of lower resistance than that of the path through semiconductor switch component 222, but transitioning between conducting and non-conducting states can be achieved at much faster rates in semiconductor switch component 222 than in bypass switch circuit 224. Accordingly, switching mechanism 220 may be "preconditioned" for notching operations, such as by opening bypass switch component 224 in anticipation of rapid switch transitions by semiconductor switch component 222 to form the voltage notches.

In one embodiment, a plurality of switch transition boundaries 382a-382d may be established by, for example, immutable system parameters or by user-alterable variables. As illustrated in FIG. 3C, switch transition boundaries 382a-382d, representatively referred to herein as switch transition boundary or boundaries 382, define criteria on $V_{IN}$. Voltage waveforms 385a-385c represent measurements, referred to herein as $V_{SENSE}$, of $V_{IN}$ at different times, in accordance with which bypass switch component 224 and semiconductor switch component 222 are independently operated. In the illustrated example, input voltage $V_{IN}$ is considered within nominal range when $V_{SENSE}$ is no greater than nominal threshold voltage $V_{NOM-TH}$, which corresponds with switch transition boundary 382b. Waveform 385a represents $V_{SENSE}$ that is in nominal range. An overvoltage condition exists when $V_{SENSE}$ exceeds nominal voltage threshold $V_{NOM-TH}$, such as represented by waveform 385b, but not all overvoltage conditions require removal of power from load equipment by switching component 220. That is, when $V_{IN}$ is measured prior to being filtered and surge-suppressed, some overvoltage conditions meeting the criterion $V_{SENSE} > V_{NOM-TH}$ may be handled by other processes, such as the aforementioned filtering by input filter 215i, output filter 215o, and surge-suppressed by surge suppressor 212. An overvoltage condition that requires intervention by switching mechanism 220 is referred to herein as meeting an "overvoltage condition," which occurs in the illustrated example when $V_{SENSE} \geq V_{SWLL-TH}$. Waveform 385c demonstrates such an overvoltage condition.

As illustrated in FIG. 3C, semiconductor switch component 222 may transition from conducting to non-conducting state (switch open) in response to rising $V_{SENSE}$ meeting $V_{SENSE} \geq V_{SWLL-TH}$ and may transition from non-conducting to conducting state (switch close) in response to falling $V_{SENSE}$ meeting or falling below switch transition boundary $V_B$, which corresponds to transition boundary 382b. The dual criteria realizes hysteresis in the operation of switch component 222; hysteresis may be similarly realized in bypass switch component 224 through nominal threshold voltage $V_{NOM-TH}$ and switch transition boundary $V_A$, which corresponds to transition boundary 382a. However, other criteria may be placed on the state transitions of bypass switch component 224; certain implementations may require bypass switch component 224 to remain open over multiple AC cycles, such as over the duration of a voltage swell.

Figure 4:
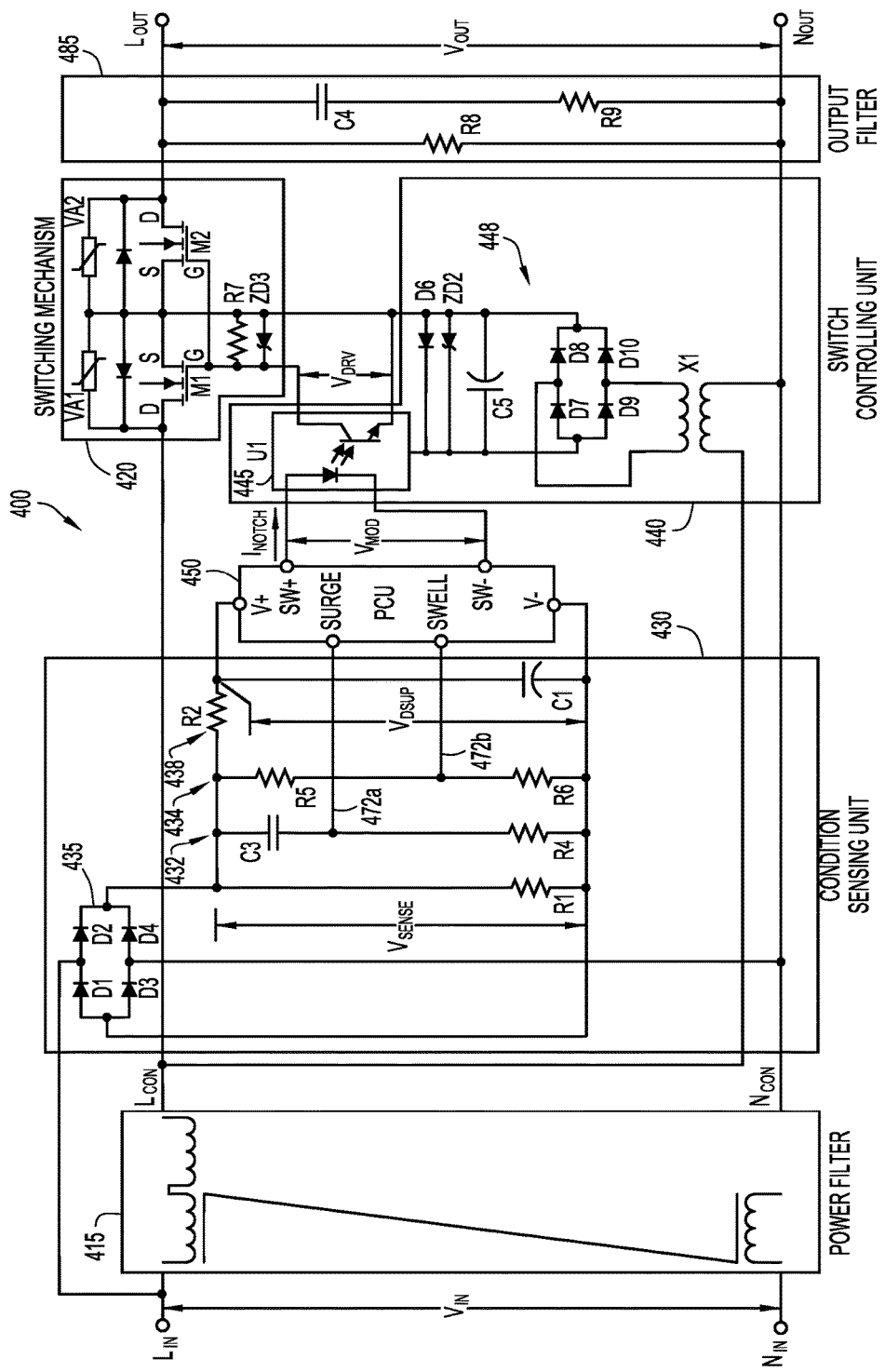
FIG. 4 is a schematic diagram of a power conditioning and control circuit by which the present general inventive concept can be embodied.

FIG. 4 is an electrical schematic diagram of an exemplary circuit 400 implementing PCCA 200 embodied in accordance with the present invention. PCCA 400 is functionally similar to PCCA 200, but is illustrated in more detail for purposes of extending the explanation of various features that can be implemented in embodiments of the present invention. Accordingly, PCCA 400 may be viewed as comprising a condition sensing unit 430, by which input electricity is monitored for anomalies, a switching mechanism 420, by which provision of output power to load equipment (not illustrated) is selectively established based on the state of the monitored input electricity, a switch controlling unit 440, by which switching mechanism 420 is operated based on the nature of particular anomalies detected in the input electricity and a power control unit (PCU) 450, by which a suitable notching signal $V_{NOTCH}$ is generated based on a power event indicated by condition-indicating signal 472. Condition-indicating signal 472 is illustrated in FIG. 4 as being provided to PCU 450 in separate signal components: a signal component 472a providing the indication of surge overvoltage events and a signal component 472b providing the indications of swell overvoltage events. It is to be understood that the present invention is not limited to particular physical and logical formats in which condition-indicating signal 472 is generated.

In certain embodiments, PCCA 400 includes a power filter 415 and an output filter 485. Power filter 415 may be electrically interposed between line and neutral conductors $L_{IN}$ and $N_{IN}$, respectively, to which an electrical power source may be connected, and line and neutral conductors $L_{CON}$ and $N_{CON}$, respectively, on which conditioned electrical power may be provided. Power filter 415 may include filtering components, such as described above with reference to input filter 215i, and surge suppression components, such as described above with reference to surge suppression circuits 212*a*-212*b*. Consequently, power filter 415 may impart a known delay in delivery of electrical current. Output filter 485 may comprise a parallel resistor R8-resistor/capacitor R9/C4 circuit to smooth output electricity between line and neutral conductors $L_{OUT}$ and $N_{OUT}$. The combination of capacitor C4 and resistor R9 forms a snubber circuit to subdue voltage transients generated when rapidly switching off a large inductive load.

Exemplary switch controlling unit 440 of PCCA 400 comprises a switch driver 445 that may be implemented by an optically isolated MOSFET/IGBT driver U1. A floating DC voltage source 448 comprising transformer X1, rectifier formed by diodes D7-D10, and capacitor C5 provides operating power for switching mechanism 420.

Exemplary switching mechanism 420 comprises a pair of power MOSFETs M1 and M2 connected one to the other at their sources and at their gates. Switch circuit 420 may be compelled into its respective conducting and non-conducting states by applying voltage $V_{DRV}$ across the commonly-connected gates by way of switch driver 445. A resistor R7 may be connected across the commonly-connected gate-source junctions to dampen oscillations owing to lead inductance and gate capacitance of MOSFETs M1 and M2. VA1 and VA2 may be 600-650V MOVs to protect MOSFETs M1 and M2 from voltage transients generated when rapidly switching off a large inductive load. Zener diode ZD2 and diode D6 protect switch driver 445.

Condition sensing unit 430 may comprise a rectifier 435 constructed from diodes D1-D4 by which input voltage $V_{IN}$ is represented through positive voltage. The rectified voltage waveform $V_{SENSE}$ appears across (relative to the common voltage of the rectifier) resistor R1, across driver supply filter 438, surge sensor 432 and swell sensor 434. Driver supply filter 438 may be implemented by a lowpass filter formed from resistor R2 and capacitor C1 to provide a driver supply voltage $V_{DSUP}$ across the V+ and V− terminals of PCU 450.

Surge sensor 432 may be implemented by a highpass filter formed of the combination of capacitor C3 and resistor R4 for which the passband is well-removed from the nominal frequency of the input signal $V_{IN}$. Indeed, values of capacitor C3 and resistor R4 may be selected to pass pulses of a predetermined, maximum duration corresponding to temporally narrow voltage surges. The output of the highpass filter, i.e., the node between capacitor C3 and resistor R4 may be connected to the SURGE terminal of PCU 450. Power events having lower frequency voltage characteristics than voltage surges may be detected by swell sensor 434, which may be implemented by a voltage divider formed of resistors R5 and R6. The output of the voltage divider, i.e., the node between resistors R5 and R6, may be connected to the SWELL terminal of PCU 450.

In response to detecting a voltage surge, referred to herein as a "surge event," PCU 450 may compel switching mechanism 420 to rapidly transition between conducting and non-conducting states so as to superimpose a voltage notch on the output electricity at the location of the voltage surge. In response to detecting a voltage swell, referred to herein as a "swell event," PCU 450 may compel switching mechanism 420 to rapidly transition between conducting and non-conducting states so as to superimpose a voltage notch on the output electricity at the location of each voltage peak in the swell where the input electricity exceeds an established overvoltage threshold, e.g., threshold voltage VswLL-TH. Those having skill in the control arts will recognize and appreciate that PCU 450 may be implemented in both analog and digital circuitry, examples of which are discussed in detail below. Accordingly, for purposes of general description, PCU 450 is illustrated in FIG. 4 as a functional block to which other circuitry of PCCA 400 is connected through terminals V+, V−, SURGE, SWELL, SW+ and SW−. However, it is to be understood that physical manifestations of the aforementioned terminals are not required to implement PCU circuitry described herein or the circuitry to which PCU circuitry is connected.

The output of PCU 450, $V_{MOD}$, may be provided to switch driver 445 of switch controlling unit 440 through switch control terminals SW+ and SW− of PCU 450. Under nominal conditions, $V_{MOD}$ may be provided to switch driver 445 at a level that exceeds an "on" threshold. Accordingly, switch driver 445 may be compelled into its on state and, in response, switching mechanism 420 is compelled into its conducting state thus providing nominal electrical power to connected load equipment. Upon an occurrence of a power event, PCU 450 may compel voltage $V_{MOD}$ below an "off" threshold and, accordingly, switch driver 445 may be compelled into its off state. In response, switching mechanism 420 may be compelled into its non-conducting state thus preventing the overvoltage from passing to load equipment.

PCCA 400 has been described with regard to normal or differential mode transients occurring between line and neutral conductors; however, it is to be understood that common mode transients may be ameliorated using the inventive concepts described herein by suitable electrical coupling to a ground conductor, as those with skill in the electrical design arts will recognize and appreciate.

Figure 5A:
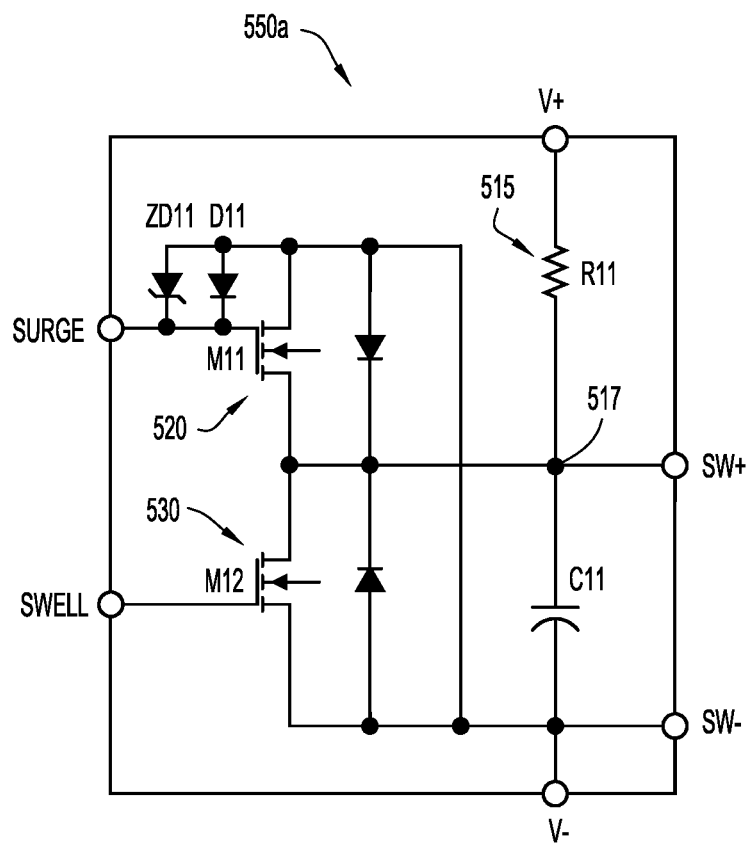
FIGS. 5A-5B are schematic block diagrams of exemplary power event handlers by which the present general inventive concept can be embodied.
Figure 5B:
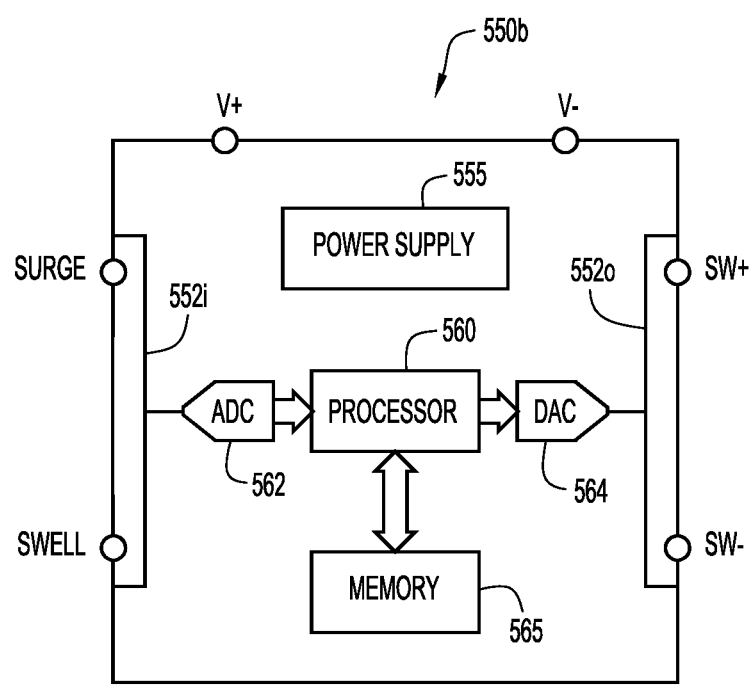

FIGS. 5A-5B are schematic diagrams of exemplary power control units (PCUs) 550*a* and 550*b*, respectively, that can be incorporated into embodiments of the present invention, e.g., as PCU 450 in PCCA 400. For purposes of description, PCUs 550*a* and 550*b*, representatively referred to herein as PCU(s) 550, are illustrated with V+, V−, SW+, SW−, SURGE and SWELL terminals that correspond to V+, V−, SW+, SW−, SURGE and SWELL terminals of PCU 450 in FIG. 4.

PCU 550*a* may be incorporated into PCCA 400 by connecting terminals V+, V−, SW+, SW−, SURGE and SWELL as terminals V+, V−, SW+, SW−, SURGE and SWELL, respectively, of PCU 450. When so connected, voltage $V_{DSUP}$ is provided across notch timer 515 comprising resistor R11 and capacitor C11. Under nominal, steady-state conditions, the voltage drop across resistor R11 produces $V_{MOD}$ across switch control terminals SW+ and SW− that compels switch driver 445 connected thereto into its ON state. As illustrated in FIG. 5A, current diverters 520 and 530 are commonly connected to output node 517 such that $V_{MOD}$ also is applied across the drain and source terminals of MOSFETs M11 and M12, respectively. The gates of MOSFETs M11 and M12 may be electrically connected to SURGE and SWELL terminals, respectively. Zener diode ZD11 and diode D11 may be connected across the gate-source junction of MOSFET M11 to protect the device from high-voltage surges.

Upon an occurrence of a surge event, i.e., when the signal at SURGE terminal goes high, current is diverted away from output node 517 through current diverter 520 in sufficient amount so as to decrease $V_{MOD}$ below the ON threshold thus compelling switch driver 445 into its OFF state. The voltage surge, being of sufficient amplitude and spectral characteristics, passes through the highpass filter of surge sensor 432 and momentarily asserts a conducting state in MOSFET M11 of current diverter 520. Capacitor C11 is thus discharged through the drain-source resistance of MOSFET M11, which is represented as voltage drop 332 in FIG. 3A.

Once the voltage across R4 of surge sensor 432 falls below the threshold voltage of MOSFET M11, MOSFET M11 transitions into its non-conducting state, at which time capacitor C11 begins charging through resistor R11. As capacitor C11 charges, voltage $V_{MOD}$ rises in accordance with the R11*C11 time constant, as illustrated at voltage rise 334 in FIG. 3A.

The time delay $T_{D\text{-}OFF}$, i.e., the time between the surge event and the transition of switching mechanism 420 into its non-conducting state is dependent upon the time in which $V_{MOD}$ falls below $V_{SW}$, i.e., the voltage level at which the LED in switch driver 445 transitions between emitting and non-emitting states. In response, switch driver 445 may be compelled into its off state, which in turn is dependent upon the time constant $R_{M11\text{-}ON}*C11$, where $R_{M11\text{-}ON}$ is the input resistance of MOSFET M11 when in its conducting state. The time delay $T_{D\text{-}ON}$, i.e., the time between the surge event and the transition of switching mechanism 420 into its conducting state is dependent upon the time in which $V_{MOD}$ crosses $V_{SW}$ and thus compelling switch driver 445 into its on state, which in turn is dependent upon the time constant R11*C11.

Upon an occurrence of a swell event, i.e., when the signal at SWELL terminal goes high, current is diverted away from output node 517 through current diverter 530 in sufficient amount so as to decrease $V_{MOD}$ below the ON threshold thus compelling switch driver 445 into its OFF state. For example, the voltage divider of R5 and R6 of swell detector 434 may be constructed to bias MOSFET M12 at the threshold $V_{SWLL\text{-}TH}$. When so embodied, MOSFET M12 is in its on state for the duration over which voltage peaks exceeds $V_{SWLL\text{-}TH}$, as described in reference to FIG. 3B. Over a corresponding interval, current is drawn from output node 517 through MOSFET M12 of current diverter 530. When $V_{MOD} \geq V_{SW}$, the output $V_{DRV}$ of switch driver 445 is in its on state to compel switching mechanism 420 into its conducting state. Conversely, when $V_{MOD} < V_{SW}$, the voltage $V_{DRV}$ is in its off state to compel switching mechanism 420 into its non-conducting state. FIG. 5B is a schematic block diagram of another exemplary event handler 550b. PCU 550b may be incorporated into PCCA 400 by connecting terminals V+, V−, SW+, SW−, SURGE and SWELL as terminals V+, V−, SW+, SW−, SURGE and SWELL, respectively, of PCU 450 in FIG. 4. PCU 550b may include a processor 560 communicatively coupled to memory 565. Memory 565 may be constructed or otherwise configured to store both data and code, i.e., programmed processor instructions that, when executed by processor 560, performs power event handling functions described herein. To that end, PCU 550b may comprise input/output circuitry 552, representatively illustrated by input circuit 552i and output circuit 552o, electrically coupled to analog-to-digital converter (ADC) circuitry 562 and digital-to-analog converter (DAC) circuitry 564.

PCU 550b may include a power supply 555 to produce operating power for the analog and digital circuitry thereof. Power supply 555 may be of conventional construction and replaces the need for a driver supply voltage $V_{DSUP}$: the modulation signal on terminals SW+ and SW− may be generated by DAC 564 under control of processor 560. Condition-indicating signals on terminals SURGE and SWELL may be converted into numerical values by ADC 562 and utilized by processor 560 to make power event decisions and operate switching mechanism 420 accordingly.

Figure 6:
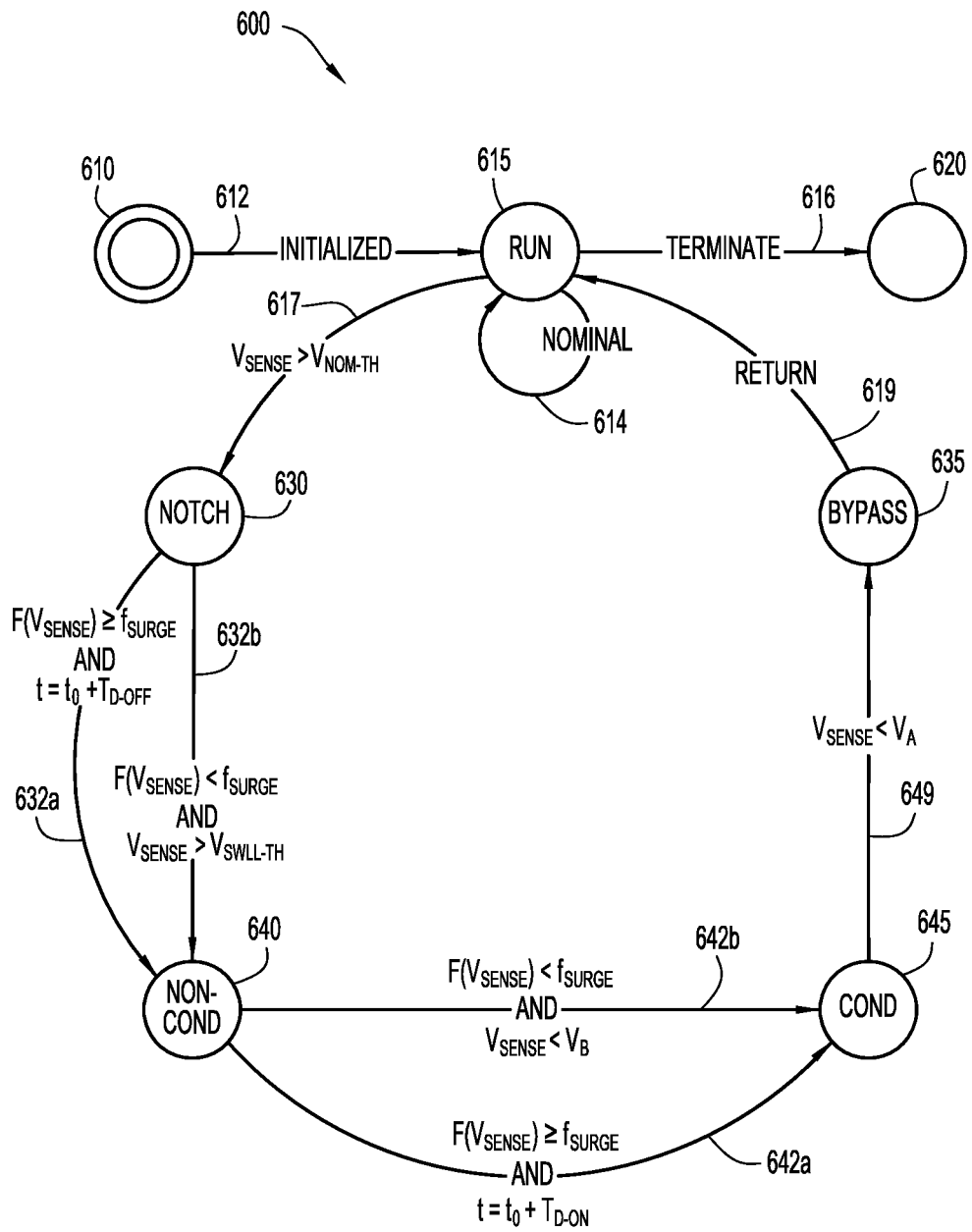
FIG. 6 is a state diagram of an exemplary state machine by which the present general inventive concept can be embodied.

FIG. 6 is a state diagram illustrative of a state machine 600. Per well-known conventions, the state diagram for state machine 600 is a directed graph in which the circular nodes represent states and the directed-arc edges represent events in response to which the state transitions occur. State machine 600 operates under conditions placed on one or more process variables that may include measurement process variables, such as $V_{SENSE}$, the input voltage measurement, $F(V_{SENSE})$, the frequency content of the input voltage, and t, the current or elapsed time. State machine 600 may be realized by processing resources on processor 560, such as for detecting events and compelling associated state transitions, and storage resources on memory 565, such as for storage of states and process variables. For purposes of succinct description, a minimal number of process variables, states and events are depicted and described with reference to FIG. 6; upon review of this disclosure, those having skill in the art will recognize and appreciate how a larger number of states, process variables, events, signals, etc., can be incorporated into embodiments of the invention without departing from the spirit and intended scope thereof.

Exemplary state machine 600 is instantiated in an initial state 610 in which PCCA 200 is initialized. Initialization may include placing switching mechanism 220 into predetermined state, e.g., bypass switch component 224 in its closed state and semiconductor switch component 222 in its non-conducting state. An initialized event 612 may occur upon completion of such initialization, in response to which exemplary state machine 600 is compelled into run state 615. Run state 615 represents the state in which PCCA 200 executes its primary processing execution loop that includes, among other things, monitoring of various process variables and compelling state transitions in response to process events. Such execution loop may be exited through a terminate event 616, such as by user issuance of a "quit" command or the like, in response to which state machine 600 transitions into terminal state 620.

In certain embodiments, power controller 250 may monitor characteristics of the input voltage (and/or other processes and signals) through process variables $V_{SENSE}$ and $F(V_{SENSE})$ and a nominal event 614 may occur responsive to voltage and frequency of the supplied input power being within a predefined nominal range. State machine 600 may be configured to remain in run state 615 in response to each nominal event 614. For purposes of description, a number of state transition boundaries on the input voltage, such as those described with reference to FIG. 3C, may be defined: $V_A \leq V_{NOM\text{-}TH} < V_B \leq V_{SWLL\text{-}TH}$, where $V_{NOM\text{-}TH}$ is an overvoltage level set at the upper bound of the nominal input voltage range and $V_{SWLL\text{-}TH}$ is an overvoltage level set at voltage swell threshold, i.e., the voltage at which equipment deterioration or damage can result from a voltage swell.

State machine 600 may transition into a notch state 630 in response to overvoltage event 617, which occurs when $V_{SENSE} > V_{NOM\text{-}TH}$. While in notch state 630, power control unit 250 may compel bypass switch component 224 into its open state such that load current is controlled solely through semiconductor switch component 222. From notch state 630, state machine 600 may transition into a non-conducting state 640 in response to surge overvoltage mitigation event 632a, occurring when $F(V_{SENSE}) \geq f_{SURGE}$ AND $t = t_0 + T_{D\text{-}OFF}$, or swell overvoltage mitigation event 632b, occurring when $F(V_{SENSE}) < f_{SURGE}$ AND $V_{SENSE} \geq V_{SWLL\text{-}TH}$.

In non-conducting state 640, semiconductor switch component 222 may be operated into its non-conducting state in which electrical power is removed from load equipment 20. Semiconductor switch component 222 may be returned to its conducting state so as to restore electrical power to load equipment 20 when state machine 600 transitions to conducting state 645 in response to either of restoration events 642a or 642b. Surge restoration event 642a occurs when $F(V_{SENSE}) \geq f_{SURGE}$ (i.e., a surge event) AND $t = t_0 + T_{D\text{-}ON}$, i.e., subsequent to a delay time $T_{D\text{-}ON}$ measured from the time the voltage surge was detected. Swell restoration event 642b may occur when $F(V_{SENSE}) < f_{SURGE}$ (i.e., a non-surge event) AND $V_{SENSE} < V_B$.

When power controller 250 determines the surge and/or swell conditions have cleared, a clearance event 649 may occur, e.g., $V_{SENSE}$ falls below voltage threshold $V_A$. In response to clearance event 649, state machine 600 may transition into a bypass state 635 in which bypass switch component 224 is closed. In certain embodiments, semiconductor switch component 222 is compelled into its non-conducting state once bypass switch component 224 has been closed. When switching mechanism 220 has been so configured for nominal voltage operation, a return event 619 may occur in response to which state machine 600 may transition into run state 615.

It is to be understood that the foregoing is merely an example of a state machine implementation of PCU 250 and is provided for purposes of explanation and not limitation. Those having skill in the art may recognize numerous alternatives, including other state machine configurations that can be implemented in embodiments of the invention without departing from the spirit and intended scope thereof. In one such alternative embodiment, in which switching mechanism 220 excludes bypass switch component 224, state machine 600 may not implement bypass state 635 or notch state 630.

Figure 7:
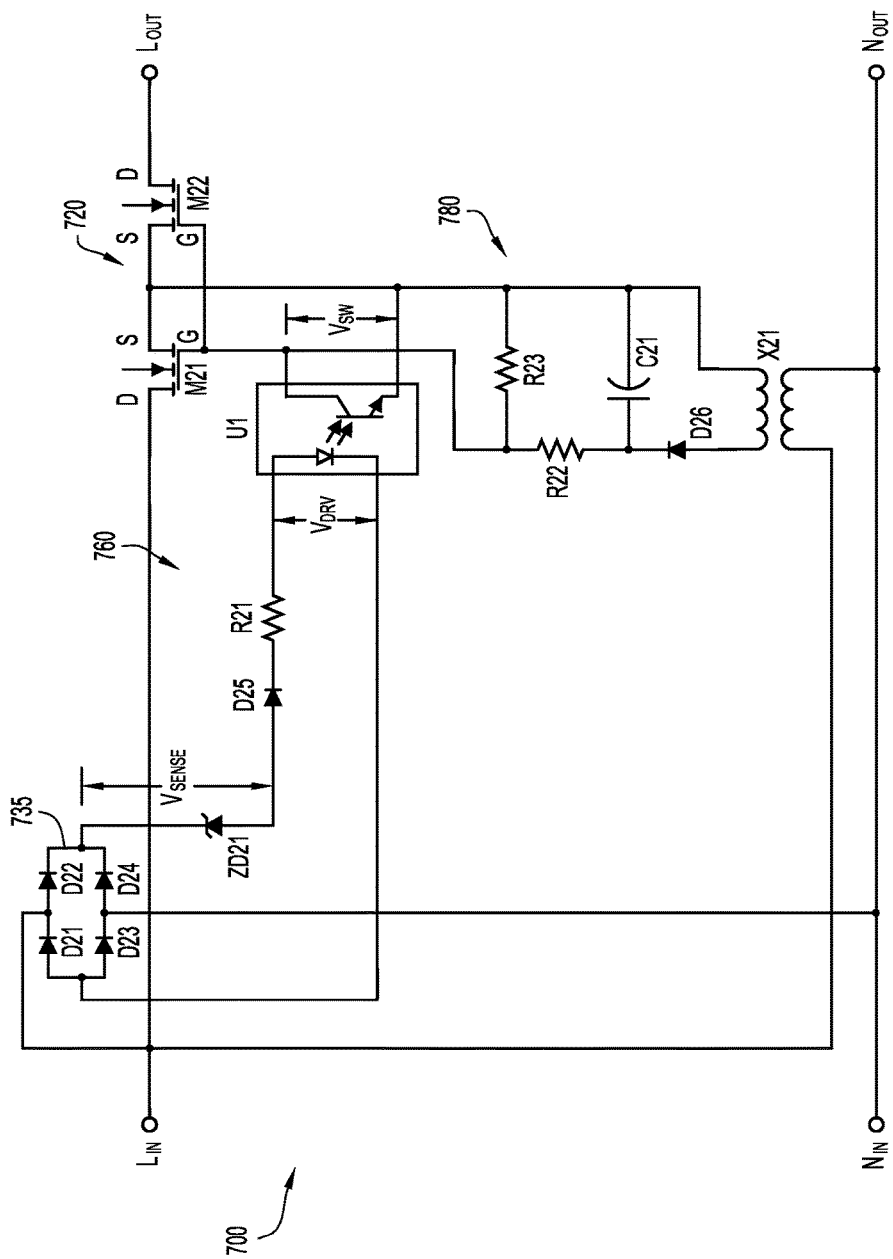
FIG. 7 is a schematic diagram of a voltage swell mitigation circuit by which the present general inventive concept can be embodied.

FIG. 7 is a schematic block diagram of another embodiment 700 of the present invention by which persistent overvoltage can be mitigated. Switching mechanism 720 may comprise a pair of power MOSFETs M21 and M22 connected one to the other at their sources and at their gates. Switching mechanism 720 may also include a bypass switch component (not illustrated) such as previously described. Power supply 780 comprising transformer X21, diode D26, capacitor C21 and resistors R22 and R23 provides gate-source driving voltage for MOSFETs M21 and M22 of switching mechanism 720. The output of rectifier 735, constructed from diodes D21-D24, is connected to a swell sensor 760 comprising Zener diode ZD21, diode D25 and resistor R21, which may be connected electrically in series with an optically-isolated MOS relay UH1.

During nominal operation where $V_{SENSE}$ is within tolerance, MOSFETs M21 and M22 are in their respective conducting states. Upon detection of an overvoltage condition, MOSFETs M21 and M22 are compelled into their respective non-conducting states. Zener diode ZD21 of swell sensor 760, having been selected to establish a predetermined threshold, conducts for those portions of the AC waveform that exceed that threshold to cause the LED in UH1 to emit light. Relay UH1 may be configured as a current-diverter and, in response to its LED emitting light, diverts current away from the gate-source junctions of both MOSFETs M21 and M22, thus compelling both transistors into their respective non-conducting states.

Figure 8:
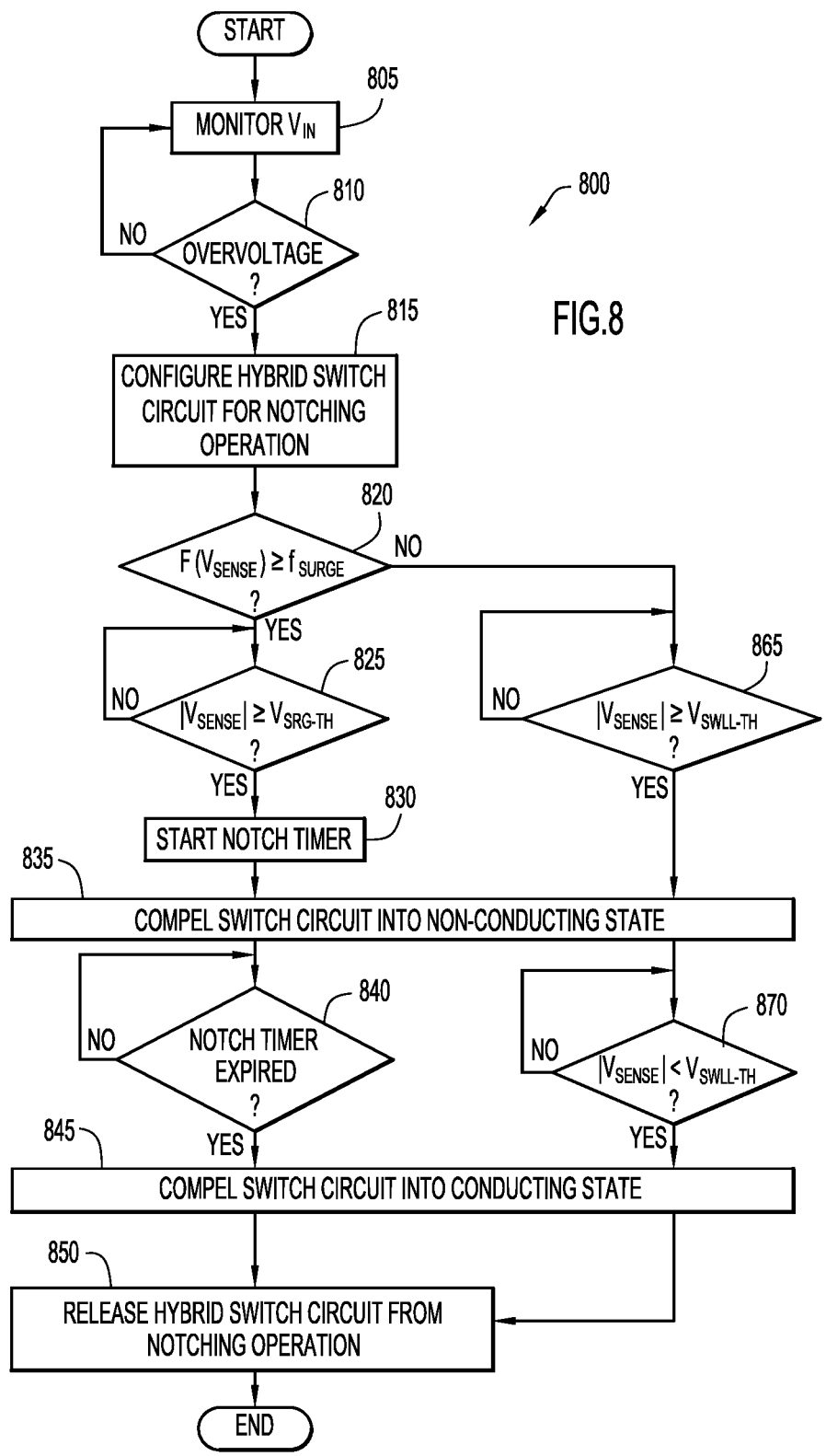
FIG. 8 is a flow diagram of a power control process by which the present general inventive concept can be embodied.

FIG. 8 is a flow diagram of a power control process 800 by which the present invention can be embodied. Power control process 800 can be implemented by electrical and/or electronic circuitry, as described above, or as suitably programmed processor instructions executing on a processor, e.g., a microcontroller and/or microprocessor. In operation 805, input voltage $V_{IN}$ is monitored and, in operation 810, the monitored input voltage is evaluated for an overvoltage condition. If it is determined that an overvoltage condition exists, process 800 may transition to operation 815 by which the hybrid switch circuit, if such is being utilized, is prepared for notching operations. For example, in one embodiment where the hybrid switch comprises an electromagnetic bypass relay across a semiconductor switch circuit, the semiconductor switch circuitry can be compelled into its conducting state and the electromagnetic relay can be compelled into its open state. However, it is to be understood that operation 815 can be omitted or replaced with a switch configuration operation suitable to the switch architecture used.

In operation 820, it is determined whether the frequency content of the input electricity $F(V_{SENSE})$ is greater than a predetermined frequency threshold $f_{SURGE}$, such as by the use of an analog or digital highpass filter. If it is affirmed that $F(V_{SENSE}) \geq f_{SURGE}$, it is determined in operation 825 whether the amplitude of $V_{SENSE}$, $|V_{SENSE}|$, is greater than a trigger threshold established for surge triggering, $V_{SRG\text{-}TH}$. In response to such occurring, process 800 may transition to operation 830 by which a notch timer may be started, which may be achieved by, for example, a resistor-capacitor delay circuit as described above. Alternatively, such may be achieved through a processor-configurable timer circuit or counter. In operation 835, the switch circuit may be compelled into its non-conducting state. In operation 840, it is determined whether the notch timer has expired. Once such has occurred, the switch circuit may be compelled into its conducting state in operation 845 and, in operation 850, the hybrid switch circuit may be released from notching operations, e.g., the bypass relay can be closed and semiconductor switch circuit can be compelled into its non-conducting state.

If, in operation 820, it is determined that $F(V_{SENSE}) < f_{SURGE}$, process 800 may transition to operation 865, by which it is determined whether the amplitude $|V_{SENSE}|$ is greater than a trigger threshold established for swell triggering, $V_{SWLL\text{-}TH}$. In response to such occurring, process 800 may transition to operation 835 by which the switch circuit may be compelled into its non-conducting state. In operation 870, it is determined whether amplitude $|V_{SENSE}|$ has fallen below threshold $V_{SWLL\text{-}TH}$. Once such has occurred, the switch circuit may be compelled into its conducting state in operation 845. Process 800 may then transition to operation 850 by which the hybrid switch circuit may be released from notching operations, e.g., the bypass relay can be closed and semiconductor switch circuit can be compelled into its non-conducting state.

Having described preferred embodiments of new and improved power-centric conditioning and control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

The invention claimed is:

1. An apparatus to protect an electrical load connected to an output port thereof from anomalous electricity accepted through an input port thereof from an electricity supply, the apparatus comprising:
 a condition sensing unit configured to distinguish a power event type from among a plurality of power event types from characteristics, including frequency characteristics, of an input electricity waveform accepted through the input port, the condition sensing unit indicating the power event type when a corresponding overvoltage criterion is met by the characteristics of the input electricity waveform, wherein the condition sensing unit comprises a high pass filter to distinguish between a voltage surge and a voltage swell included in the plurality of power event types;

a power control unit configured to generate, responsive to a power event, a modulation signal that defines at least one amplitude notch in the input electricity waveform in accordance with the power event type; and a switching mechanism electrically interposed between the input port and the output port and being configured to transition into conducting and non-conducting states in accordance with the modulation signal to superimpose thereby the notch on the input electricity waveform.

2. The apparatus of claim 1, wherein power control unit generates the modulation signal in accordance with notch parameters associated with each of the power event types, the notch parameters including a notch onset time and a notch completion time.

3. The apparatus of claim 2, further comprising:
a timing unit to establish, in the modulation signal for one of the power event types, the notch completion time relative to an event time of the power event.

4. The apparatus of claim 3, further comprising:
a threshold detector that establishes the notch completion time for another of the power event types as a response to a voltage threshold condition being met by the input electricity.

5. The apparatus of claim 1, further comprising:
a delay circuit electrically interposed between the input terminals and the switching mechanism and being configured to impart a predetermined temporal delay in delivery of current from the input terminal to the switching mechanism, the temporal delay being included in a notch onset time.

6. The apparatus of claim 5, wherein the delay circuit is an electrical input filter.

7. An apparatus to protect an electrical load connected to an output port thereof from anomalous electricity accepted through an input port thereof from an electricity supply, the apparatus comprising:

a condition sensing unit configured to distinguish a power event type from among a plurality of power event types from characteristics, including frequency characteristics, of an input electricity waveform accepted through the input port, the condition sensing unit indicating the power event type when a corresponding overvoltage criterion is met by the characteristics of the input electricity waveform, wherein the power event types distinguished by the condition sensing unit include a voltage surge and a voltage swell;

a power control unit configured to generate, responsive to a power event, a modulation signal that defines at least one amplitude notch in the input electricity waveform in accordance with the power event type;

a switching mechanism electrically interposed between the input port and the output port and being configured to transition into conducting and non-conducting states in accordance with the modulation signal to superimpose thereby the notch on the input electricity waveform; and a delay circuit electrically interposed between the input terminals and the switch circuit switching mechanism and being configured to impart a predetermined temporal delay in delivery of current from the input terminal to the switching mechanism, the temporal delay being included in a notch onset time of the notch.

8. The apparatus of claim 7, wherein the delay circuit is an electrical input filter.

9. The apparatus of claim 7, wherein the condition sensing unit includes a high pass filter to distinguish the voltage surge from the voltage swell.

10. An apparatus to protect an electrical load connected to output terminals thereof from anomalous electricity conditions, the apparatus comprising:

a switching mechanism configured to transition into one of conducting and non-conducting states in response to respective on and off states of a switching driving signal provided thereto; and a condition sensing unit to indicate an overvoltage event in response to a peak voltage of input electricity provided by the electricity source meeting a threshold condition of a voltage swell, and to distinguish an event type of the overvoltage event from another event type through input frequency characteristics of the input electricity, wherein the overvoltage event types distinguished by the condition sensing unit include a voltage surge and the voltage swell, and the condition sensing unit comprises a high pass filter configured to distinguish the voltage surge from the voltage swell;

a power control unit configured to generate a modulation signal in response to the overvoltage event to coordinate the state transitions of the switching mechanism with arrival of the voltage peak thereat; and a switch controlling unit to generate the switch driving signal and compel the state transitions of the switching mechanism thereby such that the peak voltage is decreased by an amplitude notch superimposed on output electricity provided to the electrical load.

11. The apparatus of claim 10, further comprising:
a delay circuit electrically interposed between the input terminals and the switching mechanism and being configured to impart a predetermined temporal delay in delivery of current from the input terminal to the switching mechanism, the temporal delay being included in a notch onset time of the notch.

12. The apparatus of claim 11, wherein the delay circuit is an electrical input filter.

13. The apparatus of claim 10, wherein the overvoltage event of the other event type occurs in response to the frequency characteristics meeting a frequency threshold condition.

14. The apparatus of claim 13, wherein the power control unit includes a state machine comprising a plurality of states, the power control unit compelling state transitions in response to overvoltage events that include overvoltage events having the event type and the other event type.

15. A power control method comprising:
protecting an electrical load connected to an output port thereof from anomalous electricity accepted through an input port thereof from an electricity supply, the apparatus comprising:

distinguishing a power event type from among a plurality of power event types from characteristics, including frequency characteristics, of an input electricity waveform accepted through an input port connected to an electricity supply, an overvoltage event of the power event type occurring when a corresponding overvoltage criterion is met by the characteristics of the input electricity waveform, wherein the distinguishing includes high pass filtering the input electricity waveform to distinguish between a voltage surge and a voltage swell included in the plurality of power event types;

generating, responsive to the overvoltage event, a modulation signal that defines at least one amplitude notch in the input electricity waveform in accordance with the power event type; and compelling a switching mechanism electrically interposed between the input port and an output port connected to an electrical load to transition into conducting and non-conducting states in accordance with the modulation signal to superimpose thereby the notch on the input electricity waveform.

16. The method of claim 15, further comprising:

imparting a predetermined temporal delay in delivery of current from the input port to the switching mechanism, the temporal delay being included in a notch onset time of the notch.

17. The method of claim 15, wherein a power control unit generates the modulation signal in accordance with notch parameters associated with each of the power event types, the notch parameters including a notch onset time and a notch completion time.

18. The method of claim 17, further comprising:

establishing, in the modulation signal for one of the power event types, the notch completion time relative to an event time of the overvoltage event.

19. The method of claim 18, further comprising:

establishing the notch completion time for another of the event types as a response to a voltage threshold condition being met by the input electricity.

* * * * *